United States Patent
Horiuchi (10) Patent No.: US 10,197,941 B2
(45) Date of Patent: Feb. 5, 2019

(54) IMAGE FORMING APPARATUS

(71) Applicant: CANON KABUSHIKI KAISHA, Tokyo (JP)

(72) Inventor: Izuru Horiuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/788,580

(22) Filed: Oct. 19, 2017

(65) Prior Publication Data
US 2018/0120728 A1 May 3, 2018

(30) Foreign Application Priority Data
Nov. 2, 2016 (JP) ................. 2016-215366

(51) Int. Cl.
*G03G 15/043* (2006.01)
*H04N 1/00* (2006.01)

(52) U.S. Cl.
CPC ............. *G03G 15/043* (2013.01); *H04N 1/00* (2013.01)

(58) Field of Classification Search
CPC .... G03G 15/5033; G03G 15/043; H04N 1/00; G06K 15/12
See application file for complete search history.

(56) References Cited

U.S. PATENT DOCUMENTS

| | | | |
|---|---|---|---|
| 9,715,189 B2 | 7/2017 | Horiuchi et al. | ..... G03G 15/043 |
| 2017/0019560 A1 | 1/2017 | Horiuchi et al. | ..... H04N 1/4052 |
| 2017/0019562 A1 | 1/2017 | Furuta et al. | ........ H04N 1/4052 |
| 2017/0019564 A1 | 1/2017 | Horiuchi | ............. H04N 1/4052 |
| 2017/0277064 A1 | 9/2017 | Horiuchi | ............. G03G 15/043 |
| 2017/0277095 A1 | 9/2017 | Horiuchi | ............ G03G 15/5033 |
| 2017/0285510 A1 | 10/2017 | Furuta et al. | ........ G03G 15/043 |

FOREIGN PATENT DOCUMENTS

JP  2005-096351  4/2005

*Primary Examiner* — Christopher D Wait
(74) *Attorney, Agent, or Firm* — Venable LLC (57) ABSTRACT

Provided is an image forming apparatus including: an exposure unit scanning a photosensitive member with a light beam radiated by a light source which is driven by a driving unit; a determination unit determining a number of bit data per pixel for a predetermined pixel of image data; a selection unit having conversion conditions for converting the image data into a bit pattern for the driving, and selecting a predetermined conversion condition depending on the determined number of bit data, the conversion conditions set such that numbers of bit data included in the obtained bit pattern for the radiating are different, and that the numbers of bit data are different depending on the image data; and a generation unit generating, based on the selected predetermined conversion condition and a density value of the predetermined pixel, the bit pattern for generating a PWM signal for the driving for the predetermined pixel.

7 Claims, 5 Drawing Sheets

IMAGE FORMING APPARATUS

BACKGROUND OF THE INVENTION

Field of the Invention

The present invention relates to an linage forming apparatus, for example, a digital copying machine, and more particularly, to an image forming apparatus configured to perform magnification correction in a main scanning direction.

Description of the Related Art

In an electrophotographic image forming apparatus, for example, a digital copying machine, an image is formed by forming an electrostatic latent image on a photosensitive member through control of laser in accordance with an image signal, and by performing developing, transfer, and fixing steps. Laser light to irradiate the photosensitive member is deflected by a rotary polygon mirror. The photosensitive member is scanned with the laser light in a direction (hereinafter referred to as "main scanning direction") crossing a direction of rotation of the photosensitive member. The laser light deflected by the rotary polygon mirror is guided onto the photosensitive member via an fθ lens. The photosensitive member is scanned substantially at a constant speed with the laser light that has passed through the fθ lens.

Depending on accuracy of the fθ lens, the speed at which the photosensitive member is scanned with the laser light in the main scanning direction varies slightly for a scanning position. To address this problem, in a related-art image forming apparatus, a variation in magnification in the main scanning direction, which is caused by a variation in speed of scanning with the laser light, is corrected by correcting image data. For example, in Japanese Patent Application Laid-Open No. 2005-96351, there is disclosed an image forming apparatus, which is configured to generate a bit pattern, which is a bit data string of a plurality of bits for generating a PWM signal, using a conversion table based on gradation data (plurality of bits) indicating a density value of one pixel. Bit data is inserted to the bit pattern obtained by the conversion depending on the position of scanning with the laser light. Alternatively, a part of bit data is deleted from the bit pattern obtained by the conversion depending on the position of scanning with the laser light. A width in the main scanning direction of an image is thus corrected. The image forming apparatus of Japanese Patent Application Laid-Open No. 2005-96351 outputs bit data included in the bit pattern, to or from which the bit data is added or deleted, bit by bit in accordance with a clock signal. As a result, the PWM signal is output to a laser control circuit. According to the image forming apparatus of Japanese Patent Application Laid-Open No. 2005-96351, the number of bit data included in the bit pattern corresponding to one pixel may be varied depending on the position of scanning with the laser light to correct the magnification corresponding to each scanning position in the image.

The image forming apparatus of Japanese Patent Application Laid-Open No. 2005-96351 adds or deletes the bit data to or from the bit pattern, which has been obtained by converting the gradation data, irrespective of the density value. Therefore, as a magnification correction amount becomes larger, a larger difference in gradation characteristics between an input image and an output image is generated.

SUMMARY OF THE INVENTION

It is an object of the present invention to suppress a reduction in gradation characteristics of an output image.

In order to solve the above-mentioned problem, the present invention has the following structures.

That is an image forming apparatus including: a photosensitive member configured to rotate in a first direction; an exposure unit, which includes a light source configured to radiate a light beam and a driving unit configured to drive the light source, and which is configured to scan the photosensitive member with the light beam in a second direction substantially orthogonal to the first direction to form an electrostatic latent image; a determination unit configured to determine, depending on a position in the second direction of a predetermined pixel of image data that has been input, a number of bit data per pixel for the predetermined pixel; a selection unit, which has a plurality of conversion conditions for converting the image data into a bit pattern for driving the driving unit, and which is configured to select a predetermined conversion condition from among the plurality of conversion conditions depending on the number of bit data determined by the determination unit, the plurality of conversion conditions being set such that numbers of bit data included in the bit pattern obtained after the conversion for radiating the light beam are different, and such that the numbers of bit data are different depending on the image data; and a generation unit, configured to generate, based on the predetermined conversion condition selected by the selection unit, and on a density value of the predetermined pixel, the bit pattern for generating a PWM signal for driving the driving unit for the predetermined pixel.

According to the present invention, a reduction in gradation characteristics of an output image can be suppressed.

Further features of the present invention will become apparent from the following description of exemplary embodiments with reference to the attached drawings.

DESCRIPTION OF THE EMBODIMENTS

Exemplary embodiments of the present invention are illustratively described in detail below with reference to the drawings. A direction of an axis of rotation of a photosensitive drum, which is a direction in which scanning is performed with a laser beam, is defined as a main scanning direction that is a second direction. A rotational direction of the photosensitive drum, which is a direction substantially orthogonal to the main scanning direction, is defined as a sub-scanning direction that is a first direction.

Scanning Speed of Image Forming Apparatus without fθ Lens

Figure 5A:
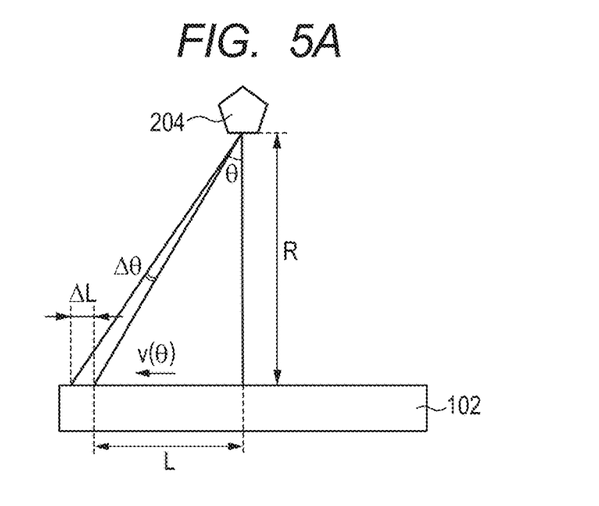
FIG. 5A is a diagram for illustrating a correction amount in an optical scanning device without an fθ lens of a related art.

FIG. 5A is a diagram for illustrating a correction amount for the structure using no fθ lens, in other words, the structure in which a photosensitive drum 102 (photosensitive member) is scanned directly with a laser beam deflected by a rotary polygon mirror 204. An angular velocity of the rotary polygon mirror 204 is represented by ω, and an angle of incidence to the photosensitive drum 102 is represented by θ. Moreover, with an angle of incidence at which a laser beam perpendicularly enters the photosensitive drum 102 being 0°, a distance from the rotary polygon mirror 204 to the photosensitive drum 102 at that time is represented by R. With respect to a position on the photosensitive drum 102 at which the angle of incidence θ is 0, a distance in a scanning direction (hereinafter referred to as "main scanning direction") of the laser beam on the photosensitive drum 102 for an angle of incidence θ is represented by L. When scanning is performed with the laser beam over the distance L in time t, approximate derivation of a scanning speed v(θ) with the laser beam is expressed by Expressions (1) to (4) below. Here, a distance by which the laser beam is moved on the photosensitive drum 102 when an angle is changed from the angle of incidence θ by Δθ is represented by ΔL.

$$\Delta L = R \cdot \tan(\theta + \Delta\theta) - R \cdot \tan(\theta) \quad \text{Expression (1)}$$

$$\frac{\Delta L}{\Delta \theta} = R \cdot \frac{\tan(\theta + \Delta\theta) - \tan(\theta)}{\Delta \theta} \quad \text{Expression (2)}$$
$$\Delta\theta \to 0$$

$$\frac{\Delta L}{\Delta \theta} = R \cdot \tan'(\theta) = \frac{n}{\cos^2(\theta)} \quad \text{Expression (3)}$$

$$v(\theta) = \frac{\Delta L}{\Delta t} = \frac{\Delta L}{\Delta \theta} \cdot \frac{\Delta \theta}{\Delta t} = \frac{\Delta L}{\Delta \theta} \cdot \omega = \frac{R\omega}{\cos^2(\theta)} \quad \text{Expression (4)}$$

As illustrated in FIG. 5A, in the image forming apparatus without the fθ lens, the laser beam is obliquely radiated to the photosensitive drum 102 as approaching an end portion of the photosensitive drum 102. Therefore, a scanning speed v(θ) at the end portion of the photosensitive drum 102 is higher than a scanning speed v(θ) at a center portion of the photosensitive drum 102. As a result, widths in the main scanning direction of pixels scanned in the same time are larger at the end portion than at the center portion of the photosensitive drum 102. When stated in terms of a spot shape of the laser beam, the spot shape of the laser beam becomes flatter in the main scanning direction as approaching the end portion of the photosensitive drum 102. Moreover, when stated in terms of a light intensity of the laser beam, the light intensity of the laser beam becomes smaller as approaching the end portion of the photosensitive drum 102.

Figure 5B:
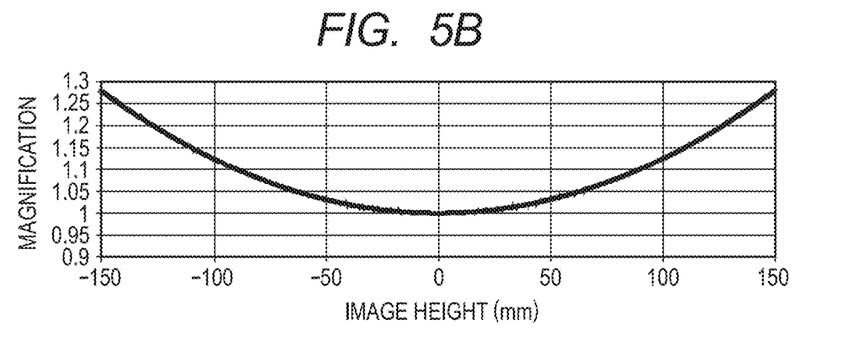
FIG. 5B is a graph for plotting an image height.

A magnification of elongation and contraction in the main scanning direction of one pixel is proportional to the scanning speed v(θ). FIG. 5B is a graph obtained by plotting the angle of incidence θ as a distance (hereinafter the term "image height" is also sometimes used) from the center in a longitudinal direction of the photosensitive drum 102 with respect to a predetermined distance R. In FIG. 5B, the horizontal axis indicates the image height with the center in the main scanning direction of the photosensitive drum 102 being 0 mm, and the vertical axis indicates the magnification. The magnification is 1.0 when the image height is 0 mm. The magnification is increased toward both ends of the photosensitive drum 102, and takes a value near 1.3 at the end portion, for example.

Consecutiveness of Gradation Errors in Sub-Scanning Direction

Figure 5C:
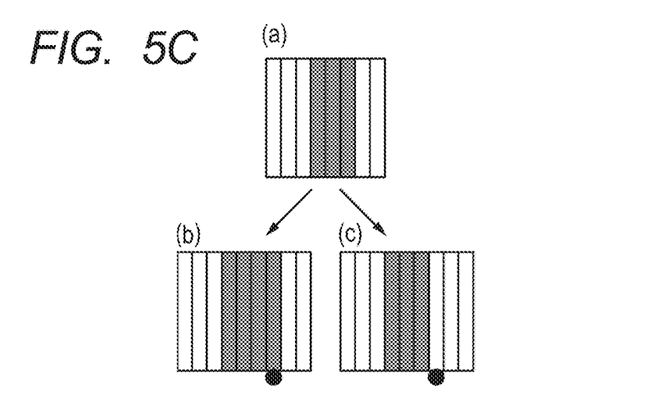
FIG. 5C is a diagram for illustrating a gradation error.

In an image forming apparatus using an fθ lens, magnification correction on the order of less than 1% is required for a variation in scanning speed caused by an error in the fθ lens. In contrast, in the image forming apparatus using no fθ lens, magnification correction of several tens of percent is required for the variation in scanning speed. Therefore, when magnification correction is performed in units of less than one pixel by inserting or deleting bit data as in the related art, a difference of about 10 times is generated in frequency of inserting or deleting the bit data between the image forming apparatus with the fθ lens and the image forming apparatus without the fθ lens. In FIG. 5C, a gradation error is illustrated. In Part (a) of FIG. 5C, one pixel is expressed by 8-bit bit data. To a reference (8/8×) gradation of Part (a) of FIG. 5C, a black bit is inserted at a position indicated by the black circle in Part (b), or a white bit is inserted to a position indicated by the black circle in Part (c). The number of bit data of one pixel is thus changed to 9 bits, and hence the magnification is changed (to 9/8×). When the magnification is changed, a density is increased in Part (b) of FIG. 5C, and the density is reduced in Part (c), with the result that the gradation is changed in each case. Therefore, with the increased number of insertion or deletion to or from the number of bit data, in the image forming apparatus without the fθ lens, it is difficult to control gradation characteristics as compared to the image forming apparatus with the fθ lens. This is also the case with an image forming apparatus including a simple fθ lens, which performs optical correction with the fθ lens.

First Embodiment

Overall Configuration of Image Forming Apparatus

Figure 1A:
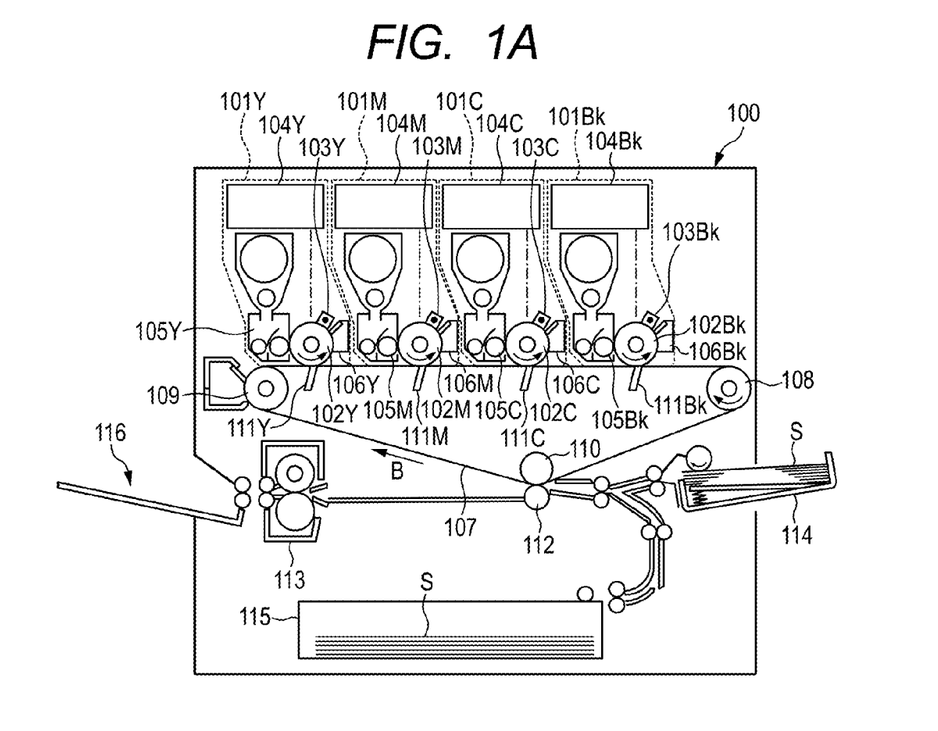
FIG. 1A is a view for illustrating the entirety of an image forming apparatus according to first to fourth embodiments of the present invention.

FIG. 1A is a schematic cross-sectional view of a digital full-color printer (color image forming apparatus) configured to perform image formation by using toners of a plurality of colors. An image forming apparatus 100 according to a first embodiment of the present invention is described with reference to FIG. 1A. The image forming apparatus 100 includes four image forming portions (image forming units) 101Y, 101M, 101C, and 101Bk (broken line portions) configured to form images of different colors, respectively. The image forming portions 101Y, 101M, 101C, and 101Bk perform image formation by using toners of yellow, magenta, cyan, and black, respectively. Reference symbols Y, M, C, and Bk denote yellow, magenta, cyan, and black, respectively. Suffixes Y, M, C, and Bk are omitted in the description below unless a particular color is described.

The image forming portions 101 each include a photosensitive drum 102, which is a photosensitive member. A charging device 103, a light scanning device 104, which is an exposure unit, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the first embodiment further includes a secondary transfer device 112 configured to transfer a toner image on the intermediate transfer belt 107 onto a sheet S being a recording medium and a fixing device 113 configured to fix the toner image on the sheet S.

An image forming process from a charging step to a developing step of the image forming apparatus 100 is described. The image forming process is the same in each of the image forming portions 101, and hence the image forming process is described with reference to an example of the image forming portion 101Y. Accordingly, descriptions of the image forming processes in the image forming portions 101M, 101C, and 101Bk are omitted. The charging device 103Y of the image forming portion 101Y charges the photosensitive drum 102Y that is driven to rotate in the arrow direction (counterclockwise direction) illustrated in FIG. 1A. The charged photosensitive drum 102Y is exposed by a laser beam emitted from the light scanning device 104Y, which is indicated by the dashed dotted line. With this operation, an electrostatic latent image is formed on the rotating photosensitive drum 102Y (photosensitive member). The electrostatic latent image formed on the photosensitive drum 102Y is developed by the developing device 105Y to form a toner image of yellow. The same step is performed also in the image forming portions 101M, 101C, and 101Bk.

The image forming process from a transfer step is described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a sheet delivery portion 116.

Photosensitive Drum and Light Scanning Device

Figure 1B:
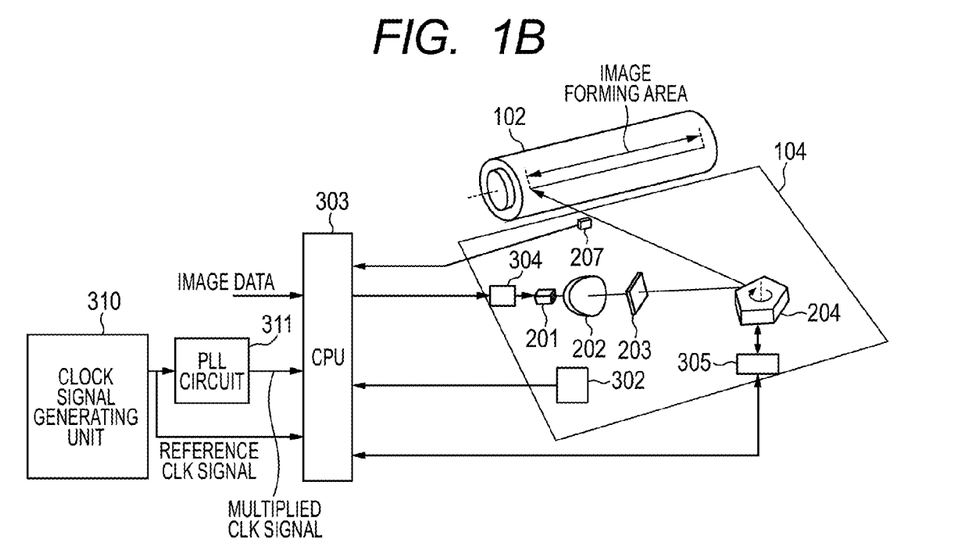
FIG. 1B is a diagram for illustrating a configuration around a photosensitive drum and an optical scanning device.

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204, which is a deflection unit. The laser light source 201 includes a light emitting element configured to emit laser beams (light beams). The collimator lens 202 is configured to collimate the laser beam. The cylindrical lens 203 condenses the laser beam having passed through the collimator lens 202 in the sub-scanning direction. In the first embodiment, the laser light source 201 is described by exemplifying a light source in which a single light emitting element is arranged, but the laser light source 201 of another embodiment of the present invention may be a multi-beam light source having a plurality of light emitting elements. The laser light source 201 is driven by a laser drive circuit (hereinafter simply referred to as "drive portion") 304. The rotary polygon mirror 204 is formed of a motor portion operative to rotate and a reflection mirror mounted on a motor shaft. In the first embodiment, the number of faces of the reflection mirror of the rotary polygon mirror 204 is five, but the present invention is not limited to this number. A face of the reflection mirror of the rotary polygon mirror 204 is hereinafter referred to as "mirror face". The rotary polygon mirror 204 is driven by a rotary polygon mirror drive portion (hereinafter referred to as "drive portion") 305. The light scanning apparatus 104 also includes a memory 302, which is a storage unit having various kinds of information stored therein.

The light scanning device 104 includes a beam detector 207 (hereinafter referred to as "BD 207"), which is a signal generating unit configured to detect the laser beam deflected by the rotary polygon mirror 204 and output a horizontal synchronizing signal (hereinafter referred to as "BD signal") in accordance with the detection of the laser beam. The laser beam emitted from the light scanning device 104 scans the photosensitive drum 102. The light scanning device 104 and the photosensitive drum 102 are positioned so that the laser beam scans the photosensitive drum 102 in a direction substantially parallel to the rotary shaft of the photosensitive drum 102. Every time the mirror face of the rotary polygon mirror 204 scans the photosensitive drum 102, a spot of the light beam is caused to scan in the main scanning direction.

Next, the controller (CPU 303) for the light scanning apparatus 104 is described. To the CPU 303, image data is input from a controller (not shown), which generates the image data, and the BD 207, the memory 302, the drive portion 304, and the drive portion 305 are connected to the CPU 303. A clock signal generating unit 310 is configured to generate a reference clock signal (hereinafter referred to as "reference CLK signal"), and output the generated reference clock signal to a phase-locked loop (PLL) circuit 311 and the CPU 303. The PLL circuit 311 is configured to generate a multiplied clock signal (hereinafter referred to as "multiplied CLK signal"), which is a signal obtained by multiplying the reference clock signal input from the clock signal generating unit 310, and output the multiplied clock signal to the CPU 303. For example, the multiplied clock signal has a frequency that is 24 times a frequency of the reference clock signal.

Circuit around Laser Diode

An example of the driving unit 304 included in the optical scanning device 104 is described with reference to FIG. 2. The optical scanning device 104 in the first embodiment includes a laser diode 1301 (hereinafter referred to as "LD"), which is a light emitter configured to emit laser light, a photodiode (hereinafter referred to as "PD") 1302, which is a light receiver configured to receive the laser light, and a resistor 1303. The LD 1301 and the PD 1302 are included in one semiconductor laser chip, for example. The resistor 1303 is an electronic part independent of the semiconductor laser chip.

Figure 2:
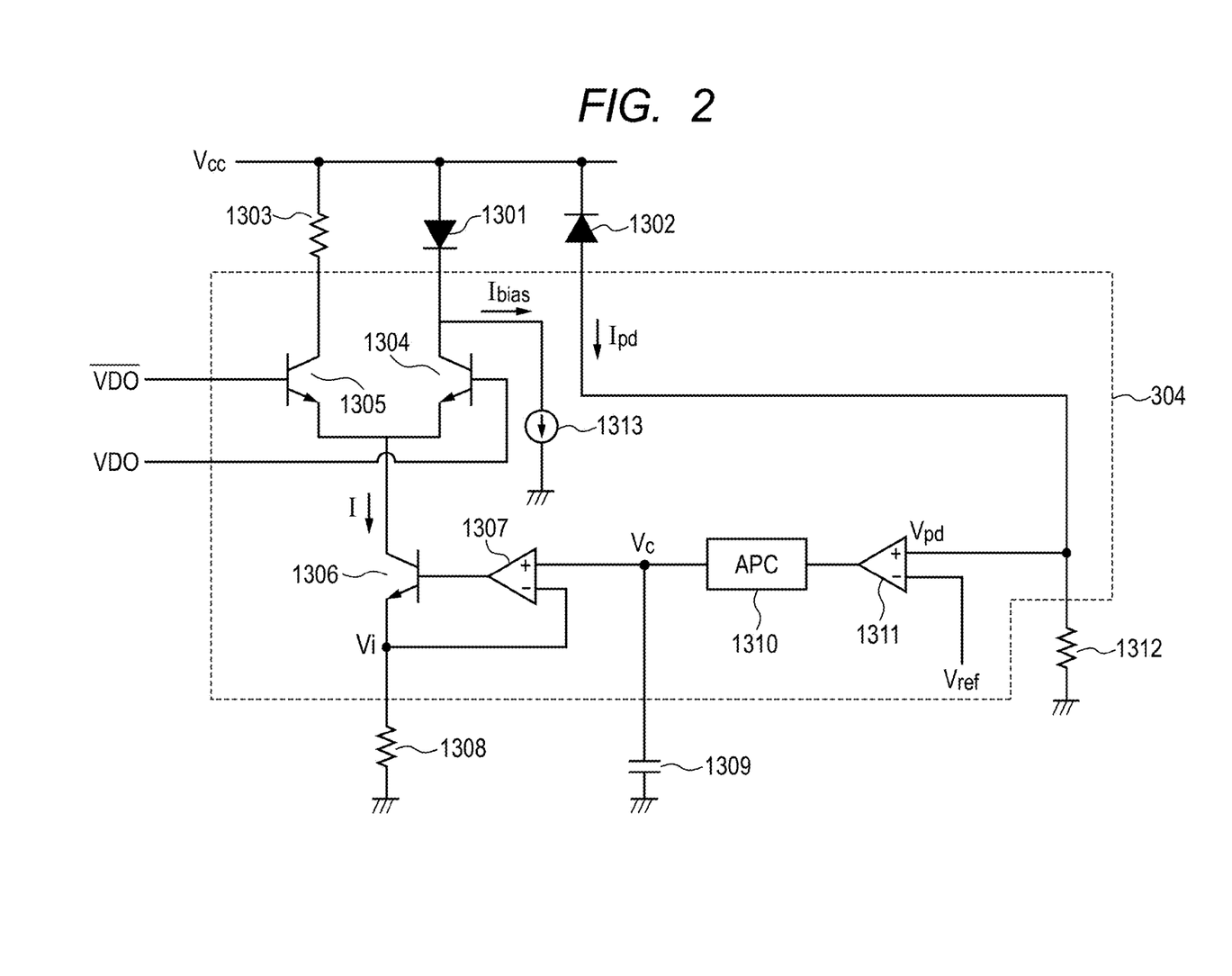
FIG. 2 is a circuit diagram of a laser driving circuit of the first to fourth embodiments.

As illustrated in FIG. 2, the LD 1301 is connected to a collector terminal of a transistor 1304. The resistor 1303 is connected to a collector terminal of a transistor 1305. The transistor 1304 has a base terminal, to which a VIDEO signal (VDO signal), which is a PWM signal, is input. The transistor 1305 has a base terminal, to which a /VIDEO signal (/VDO signal), which is an inverted signal of the VDO signal, is input. The transistor 1304 has an emitter terminal, which is connected to an emitter terminal of the transistor 1305. A bias current source 1313 is connected between a cathode terminal of the LD 1301 and the collector terminal of the transistor 1304. The bias current source 1313 draws a constant bias current Ibias. The optical scanning device 104 of the first embodiment may use a circuit configuration in which the bias current Ibias has a variable value.

In the above-mentioned circuit configuration, when the VDO signal is at a "high" level, the transistor 1304 is turned on, with the result that a current I and a current containing the bias current Ibias flow through the LD 1301. When the VDO signal is at the "high" level, the /VDO signal is "low", and the transistor 1305 is turned off, with the result that no current flows through the resistor 1303. Meanwhile, when the VDO signal is at a "low" level, the transistor 1304 is turned off, with the result that the bias current Ibias flows through the LD 1301, but the current I does not flow therethrough. When the VDO signal is at the "low" level, the /VDO signal is "high", and the transistor 1305 is turned on, with the result that the current I flows through the resistor 1303. When only the bias current Ibias flows through the LD 1301, an amount of light emitted from the LD 1301 is so small that a potential on the photosensitive drum is not displaced. When the VDO signal is at the "high" level or the "low" level, the current I flows to the ground via a constant current circuit, which is formed of a transistor 1306, a comparator 1307, and a resistor 1308.

The PD 1302 is configured to receive the laser light emitted from the LD 1301, and generate a current Ipd corresponding to an amount of received light. A value of the current Ipd is converted into a voltage Vpd by a resistor 1312. The voltage Vpd is input to a non-inverting terminal of a comparator 1311. The comparator 1311 has an inverting terminal, to which a comparison voltage Vref, which corresponds to a current value corresponding to a target amount of light on the photosensitive drum 102. In FIG. 2, the comparison voltage Vref is generated inside the driving unit 304, but may be input from the outside.

An APC circuit 1310 is configured to charge and discharge a capacitor 1309 based on a comparison result from the comparator 1311. In other words, the APC circuit 1310 charges the capacitor 1309 when Vref>Vpd. The APC circuit 1310 discharges the capacitor 1309 when Vref<Vpd. The APC circuit 1310 maintains a voltage of the capacitor 1309 when Vref=Vpd. Controlling the voltage of the capacitor 1309 to control the amount of laser light emitted from the LD 1301 to be the target amount of light is called "automatic power control (APC)".

The capacitor 1309 is connected to a non-inverting terminal of the comparator 1307 of the constant current circuit. In other words, the non-inverting terminal of the comparator 1307 has a potential that is defined by a voltage Vc of the capacitor 1309. The comparator 1307 has an inverting terminal, to which a voltage Vi corresponding to the current I is input. In other words, the current I is converted into the voltage Vi by the resistor 1308. As illustrated in FIG. 2, the inverting terminal of the comparator 1307 has the voltage Vi. The comparator 1307 controls a base voltage of the transistor 1306 such that the inverting terminal has the voltage Vc.

Control of Rotary Polygon Mirror

The CPU 303 detects a write position of a scanning line based on the BD signal output from the BD 207, and counts a time interval of the BD signal. In this manner, the CPU 303 detects a rotation speed of the rotary polygon mirror 204, and instructs the drive portion 305 to accelerate or decelerate so that the rotary polygon mirror 204 reaches a predetermined rotation speed. The drive portion 305 supplies a driving current to the motor portion of the rotary polygon mirror 204 in accordance with an input acceleration or deceleration signal, to thereby drive a motor.

Control of Image Data

Figure 3A:
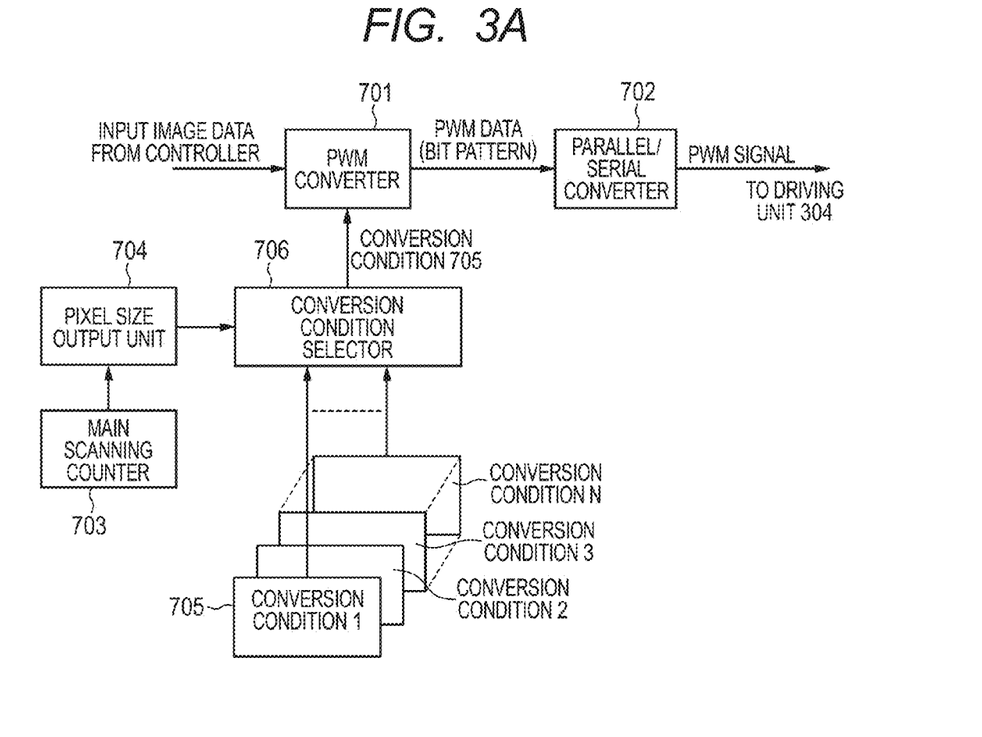
FIG. 3A is a block diagram for illustrating functions of a CPU of the first to fourth embodiments.

The CPU 303 converts the image data, which is input from the controller (not shown), into a PWM signal. The image data is a multi-level bit pattern (for example, gradation data of 4 bits or more) indicating a density value of each pixel. The PWM signal is generated by converting the gradation data into the PWM data and based on the PWM data obtained as a result of the conversion. The PWM signal is a bit pattern including a plurality of bit data items obtained by converting the gradation data based on a conversion condition, for example, a table. FIG. 3A is a block diagram for illustrating a flow in generating the PWM signal based on the gradation data by the CPU 303. A PWM signal illustrated in FIG. 3A corresponds to the VDO signal and the /VDO signal in FIG. 2. In other words, the VDO signal and the /VDO signal are differential signals generated based on the PWM signal. In FIG. 3A, a main scanning counter 703, a pixel size output unit 704, a conversion condition selector 706, and a PWM converter 701 operate in accordance with the reference clock signal. The gradation data input from the controller is converted into the PWM data (see Part (b) of FIG. 4B) by the PWM converter 701, which is a generation unit, and the PWM data is output to a parallel serial converter 702. Then, the PWM data is serially output by the parallel serial converter 702, and hence is output as the PWM signal (see Part (a) of FIG. 4B) to the drive portion 304.

The main scanning counter 703 resets a count value when the BD signal is input from the BD 207. The main scanning counter 703 increments the count value by one for each pulse of the reference clock signal. The count value of the main scanning counter 703 indicates a position (x) in the main scanning direction of a pixel formed based on each piece of image data sequentially input from the controller to the PWM converter 701. The main scanning counter 703 outputs the count value to the pixel size output unit 704, which is a determination unit. The pixel size output unit 704 is configured to read, depending on the count value input from the main scanning counter 703, a pixel size corresponding to the count value from a table that has been prepared in advance, and output a signal indicating the pixel size to the conversion condition selector 706. The "pixel size" as used herein is the number of bit data of one pixel. In the first embodiment, the pixel size includes a plurality of pixel sizes of from 24 to 32, with which a plurality of conversion conditions 1 to N (N=9) (hereinafter also referred to as "conversion conditions 705") corresponding to the plurality of pixel sizes are associated. For example, the conversion condition 1 is associated with a case in which a pixel size, which is a number of bit data of one pixel, is 24, and the conversion condition 2 is associated with a case in which a pixel size is 25. Thereafter, the conversion condition obtained by adding one to the number of the conversion condition is associated every time one is added to the pixel size. The conversion conditions 705 are described later.

Figure 3B:
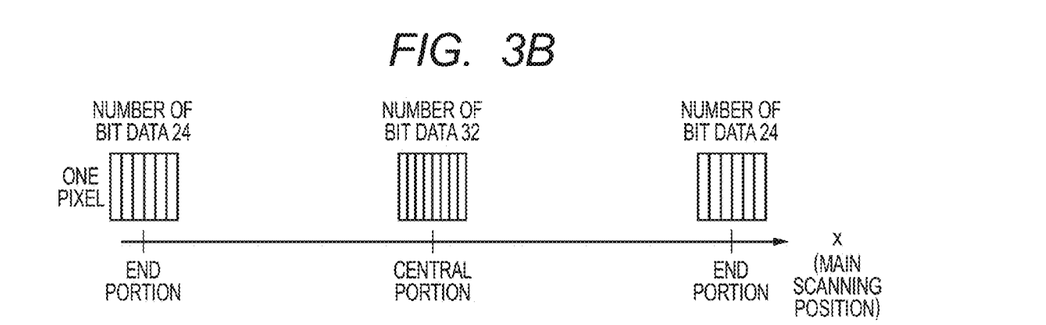
FIG. 3B is a chart for showing a change in number of bit data for a main scanning position.

In FIG. 3B, there is illustrated a state in which the pixel size output unit 704 has selected the pixel size, that is, the number of bit data of one pixel, depending on the count value input from the main scanning counter 703, in other words, a position (hereinafter referred to as "main scanning position") in the main scanning direction. In FIG. 3B, the horizontal axis indicates the main scanning position (end portions and central portion) x. Moreover, in FIG. 3B, the number of bit data of one pixel corresponding to the main scanning position is also shown. For example, in the end portions on both sides of the main scanning direction, the pixel size, which is the number of bit data of one pixel, is set to 24, and one pixel is divided into 24 parts. Moreover, in the central portion of the main scanning direction, the pixel size, which is the number of bit data of one pixel, is set to 32, and one pixel is divided into 32 parts. For pixels between the end portions and the central portion of FIG. 3B, the number of bit data of one pixel is changed and set depending on characteristics of an optical system used in the optical scanning device 104. In FIG. 3B, the number of bit data is simplified for visibility. The pixel size output unit 704 has a table in which the number of bit data (pixel size) is associated with each pixel, and other such information.

The conversion condition selector 706 is configured to select any one of conversion conditions 705 (conversion conditions 1 to N) based on a signal indicating the pixel size, which is input from the pixel size output unit 704. Here, the conversion condition 705 is a profile for associating a pixel value of a pixel input from the controller with an output density, and may be implemented by a table or a function. In the first embodiment, the image data is output as the PWM signal to the driving unit 304, and hence the conversion condition 705 is expressed as a table of bit patterns. In each of Table 1(a) and Table 1(b), an example of the conversion conditions 705 is shown.

TABLE 1

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 0 | 0 | 0 | 0 |
| 6 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 7 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 8 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| 9 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| 10 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| 11 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| 12 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| 13 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| 14 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 15 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

(a)

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 0 | 0 | 0 |
| 6 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 0 |
| 7 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
| 8 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 |
| 9 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 |
| 10 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 |
| 11 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| 12 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 |
| 13 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 |
| 14 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

(b)

In Table 1(a), there is shown the conversion condition 9 in a case in which the number of bit data of one pixel is 32 divided parts. In Table 1(b), there is shown the conversion condition 1 in a case in which the number of bit data of one pixel is 24 divided parts. In Table 1(a) and Table 1(b), one vertical column on the left indicates gradation data (0 to 15) of one pixel of the input image data, and an ON/OFF pattern of the PWM signal is indicated by 1/0 in each row corresponding to each level of the gradation data. The PWM signal corresponds to the VDO signal and the /VDO signal of the driving unit 304 of FIG. 2. In Table 1(a) and Table 1(b), "1" is bit data for generating the VDO signal at the high level and the /VDO signal at the low level. In Table 1(a) and Table 1(b), "0" is bit data for generating the VDO signal at the low level and the /VDO signal at the high level. The conversion condition selector 706 has tables of the conversion conditions 1 to 9 corresponding to the numbers of bit data of one pixel of 24 to 32, selects a conversion condition 705 corresponding to the pixel size input from the pixel size output unit 704, and outputs the selected conversion condition to the PWM converter 701.

Figure 4A:
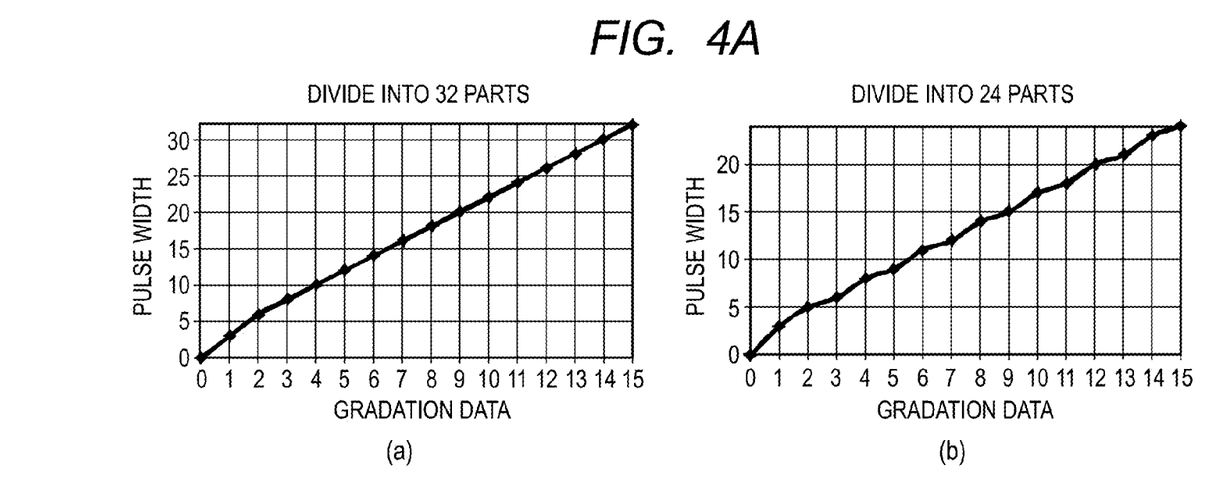
FIG. 4A is graphs for showing gradation data and a pulse width in the first to fourth embodiments.

The conversion condition 705 is a condition for converting the image data into the bit pattern for driving the driving unit 305. The conversion conditions 705 are set such that the numbers of bit data for emitting a light beam, which are included in the bit pattern obtained after the conversion, are different, and such that the numbers of bit data are different depending on the image data. In FIG. 4A, the conversion conditions 705 of Table 1(a) and Table 1(b) are expressed by the gradation data of one pixel and a pulse width. Here, the pulse width is an ON width of the PWM signal, and is expressed by "1"s in Table 1(a) and Table 1(b). In Part (a) of FIG. 4A, a case in which the number of bit data (pixel size) of one pixel is 32 is shown, and in Part (b), a case in which the number of bit data (pixel size) of one pixel is 24. Moreover, in FIG. 4A, the horizontal axis indicates the gradation data (4 bits and 16 gradation levels), and the vertical axis indicates the pulse width of the PWM signal. In the first embodiment, the conversion conditions are set to be approximated also for different numbers of bit data.

The conversion condition selector 706, which is a selection unit, outputs, to the PWM converter 701, the conversion condition 705 selected from among the conversion conditions 1 to N depending on the pixel size=24 to 32 input from the pixel size output unit 704. Based on the conversion condition 705 (table), the PWM converter 701 converts the image data (4-bit gradation data) into the bit pattern (PWM data of Part (b) of FIG. 4B) having the number of bits set in the conversion condition. The conversion condition 705 (table) is the conversion condition selected for each pixel by the conversion condition selector 706 depending on the gradation of each pixel. The PWM converter 701 outputs, to a parallel/serial converter 702, the PWM data obtained by the conversion. The bit pattern is data expressed by 0s and 1s, for example. The parallel/serial converter 702 receives in parallel the bit data included in the bit pattern input from the PWM converter 701 in accordance with the reference clock signal. The parallel/serial converter 702 outputs the bit data bit by bit in accordance with the multiplied clock signal (serial output). The bit data is thus converted into a serial signal, and the parallel/serial converter 702 outputs, to the driving unit 304, the serial signal obtained by the conversion as the PWM signal.

Figure 4B:
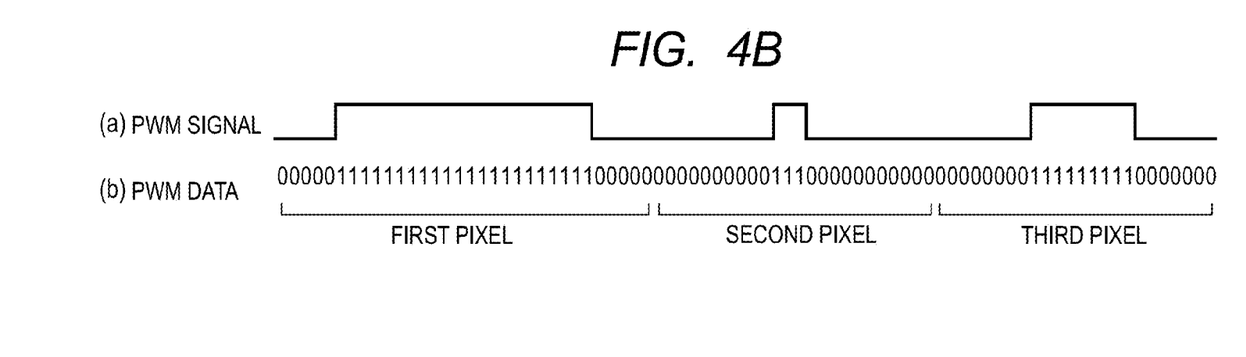
FIG. 4B is a chart for showing PWM data and a PWM signal.

For example, when continuous pixels have the pixel sizes of 32, 24, and 24, and the gradation data of 10 (bit pattern of '1010'), 1 (bit pattern of '0001'), and 5 (bit pattern of '0101'), the conversion is performed as follows. The conversion condition selector 706 selects the conversion condition 9 (Table 1(a)) corresponding to the pixel size of 32, the conversion condition 1 (Table 1(b)) corresponding to the pixel size of 24, and the conversion condition 1 corresponding to the pixel size of 24 in the stated order. The conversion condition selector 706 outputs the selected conversion condition 9, conversion condition 1, and conversion condition 1 to the PWM converter 701. The PWM converter 701 outputs, in accordance with the conversion condition 705 input from the conversion condition selector 706, the PWM data for generating the PWM signal to the parallel serial converter 702. As illustrated in FIG. 4B, the parallel/serial converter 702 converts the PWM data into a serial sequence, and outputs the PWM signal with 1 being the high level and 0 being the low level.

In FIG. 4B, there is shown a correspondence between the PWM data (bit pattern) and the PWM signal expressing 0 as the low level and 1 as the high level. In Part (b) of FIG. 4B, the PWM data output from the PWM converter 701 to the parallel serial converter 702 is illustrated. In Part (a) of FIG. 4B, the PWM signal output by the parallel serial converter 702 by converting the PWM data into a serial sequence with 1 being a high level and 0 being a low level is illustrated. For example, the first pixel has the pixel size of 32 and the gradation data of 10 (bit pattern of '1010'). The PWM converter 701 outputs, using the conversion condition 9 corresponding to the pixel size of 32 of Table 1(a), the PWM data corresponding to the gradation data 10. The same processing is performed for the second pixel and the third pixel, and a description thereof is omitted.

In the first embodiment, the pixel size output unit 704 has information on the tables and the conversion conditions 705, and the information is stored in a hard disk (not shown). The CPU 303 copies those pieces of information read from the hard disk at startup to the memory 302, and performs control so as to enable high-speed processing by accessing the memory 302 at the time of image processing.

As described above, according to the first embodiment, a reduction in gradation characteristics of an output image can be suppressed.

Second Embodiment

A second embodiment of the present invention is similar to the first embodiment in basic configuration, and is different from the first embodiment in method of expressing the conversion condition 705. In the second embodiment, the conversion condition 705 is expressed by a length of consecutive bits of a predetermined density (hereinafter referred to as "run length"). For example, in the second embodiment, the gradation is expressed by a length of consecutive white bits (0s) and a length of consecutive black bits (1s). The conversion conditions 705 of the second embodiment, which correspond to Table 1(a) and Table 1(b) of the first embodiment, are shown in Table 2(a) and Table 2(b).

TABLE 2

| Input | W | B | W' | Input | W | B | W' |
|---|---|---|---|---|---|---|---|
| 0 | 16 | 0 | 16 | 0 | 12 | 0 | 12 |
| 1 | 15 | 3 | 14 | 1 | 10 | 3 | 11 |
| 2 | 13 | 6 | 13 | 2 | 9 | 5 | 10 |
| 3 | 12 | 8 | 12 | 3 | 9 | 6 | 9 |
| 4 | 11 | 10 | 11 | 4 | 8 | 8 | 8 |
| 5 | 10 | 12 | 10 | 5 | 8 | 9 | 7 |
| 6 | 9 | 14 | 9 | 6 | 7 | 11 | 6 |
| 7 | 8 | 16 | 8 | 7 | 6 | 12 | 6 |
| 8 | 7 | 18 | 7 | 8 | 5 | 14 | 5 |
| 9 | 6 | 20 | 6 | 9 | 4 | 15 | 5 |
| 10 | 5 | 22 | 5 | 10 | 3 | 17 | 4 |
| 11 | 4 | 24 | 4 | 11 | 3 | 18 | 3 |
| 12 | 3 | 26 | 3 | 12 | 1 | 20 | 3 |
| 13 | 2 | 28 | 2 | 13 | 1 | 21 | 2 |
| 14 | 1 | 30 | 1 | 14 | 0 | 23 | 1 |
| 15 | 0 | 32 | 0 | 15 | 0 | 24 | 0 |
| (a) | | | | (b) | | | |

In Table 2(a) and Table 2(b), the first column indicates the gradation data of one pixel, W in the second column indicates the length of first white bits of white, black, and white bits of the PWM signal, and B in the third column indicates the length of black bits. When one pixel is divided by a predetermined number of bit data, a length (width) of the number of bit data expressed as white in one pixel is a run length of white bits (length (width) of white bits). Similarly, when expressed as black, a length (width) of the number of bit data is a run length of black bits (length (width) of black bits). W' in the fourth column indicates the length of last white bits of white, black, and white bits of the PWM signal, which does not exist as a register, but is determined from the following Expression (5):

$$W'=\text{pixel size}-W-B \qquad \text{Expression (5).}$$

The PWM converter 701 converts a combination of the run lengths of white and black bits into the bit pattern, and outputs the bit pattern to the parallel/serial converter 702. The subsequent operation is the same as in the first embodiment.

A configuration of the second embodiment is described with reference to FIG. 4B. For example, when consecutive pixels have pixel sizes of 32, 24, and 24 and gradation data of 10 (bit pattern of '1010'), 1 (bit pattern of '0001'), and 5 (bit pattern of '0101'), the conversion is performed as follows. The first pixel has the pixel size of 32 and the gradation data of 10 (bit pattern of '1010'). The PWM converter 701 uses W=5 and B=22 corresponding to the gradation data of 10 in Table 2(a) to determine W' as 5, and outputs the PWM data formed of 0s and 1s, which correspond to W, B, and W'. In other words, the PWM converter 701 converts the bit pattern of '1010' into '00000111111111111111111111100000' based on Table 2(a) and Table 2(b). Also for the second pixel and the third pixel, W' is similarly determined based on W and B in Table 2(a) and Table 2(b) and Expression (5), and hence a description thereof is omitted.

As described above, according to the second embodiment, a reduction in gradation characteristics of an output image can be suppressed.

Third Embodiment

A third embodiment of the present invention is similar to the first embodiment in basic configuration, and is different from the first embodiment in method of expressing the conversion condition 705. In the third embodiment, the conversion condition 705 is expressed by run lengths and a difference thereof. More specifically, in the third embodiment, the conversion condition 705 is expressed as a difference between a reference length of consecutive bits of a density (reference run length) and a predetermined length of consecutive bits of the density (predetermined run length). The conversion conditions 705 of the third embodiment, which correspond to each of Table 1(a) and Table 1(b) of the first embodiment, are shown in Table 3(a), Table 3(b), and Table 3(c).

TABLE 3

| Input | W | B | Input | W | B | W' |
|---|---|---|---|---|---|---|
| 0 | 4 | 0 | 0 | 12 | 0 | 12 |
| 1 | 5 | 0 | 1 | 10 | 3 | 11 |
| 2 | 4 | 1 | 2 | 9 | 5 | 10 |
| 3 | 3 | 2 | 3 | 9 | 6 | 9 |
| 4 | 3 | 2 | 4 | 8 | 8 | 8 |
| 5 | 2 | 3 | 5 | 8 | 9 | 7 |
| 6 | 2 | 3 | 6 | 7 | 11 | 6 |
| 7 | 2 | 4 | 7 | 6 | 12 | 6 |
| 8 | 2 | 4 | 8 | 5 | 14 | 5 |
| 9 | 2 | 5 | 9 | 4 | 15 | 5 |
| 10 | 2 | 5 | 10 | 3 | 17 | 4 |
| 11 | 1 | 6 | 11 | 3 | 18 | 3 |
| 12 | 2 | 6 | 12 | 1 | 20 | 3 |
| 13 | 1 | 7 | 13 | 1 | 21 | 2 |
| 14 | 1 | 7 | 14 | 0 | 23 | 1 |
| 15 | 0 | 8 | 15 | 0 | 24 | 0 |
| (a) | | | (b) | | | |

TABLE 3-continued

| Input | W | B | W' |
|---|---|---|---|
| 0 | 12 + 4 | 0 + 0 | 16 |
| 1 | 10 + 5 | 3 + 0 | 14 |
| 2 | 9 + 4 | 5 + 1 | 13 |
| 3 | 9 + 3 | 6 + 2 | 12 |
| 4 | 8 + 3 | 8 + 2 | 11 |
| 5 | 8 + 2 | 9 + 3 | 10 |
| 6 | 7 + 2 | 11 + 3 | 9 |
| 7 | 6 + 2 | 12 + 4 | 8 |
| 8 | 5 + 2 | 14 + 4 | 7 |
| 9 | 4 + 2 | 15 + 5 | 6 |
| 10 | 3 + 2 | 17 + 5 | 5 |
| 11 | 3 + 1 | 18 + 6 | 4 |
| 12 | 1 + 2 | 20 + 6 | 3 |
| 13 | 1 + 1 | 21 + 7 | 2 |
| 14 | 0 + 1 | 23 + 7 | 1 |
| 15 | 0 + 0 | 24 + 8 | 0 |
| (c) | | | |

In Table 3(a), there is shown the conversion condition 705 of the third embodiment in a case in which the pixel size is 32. In Table 3(c), there is shown a state of reconstructing, based on the table of Table 3(a) in which information on the differences for W and B is stored, a table in which information on the run lengths for W and B is stored. Moreover, in Table 3(b), there is shown a table in which information on the run lengths for W and B in the case of the reference pixel size is stored. In Table 3(b), the first column indicates the gradation data of one pixel, W in the second column indicates the length of first white bits of white, black, and white bits of the PWM signal, and B in the third column indicates the length of black bits. Moreover, in Table 3(b), W' in the fourth column indicates the length of last white bits of white, black, and white bits of the PWM signal, which does not exist as a register, but is determined from Expression (5). The conversion condition selector 706 includes the conversion condition 705 (Table 3(a)) in which differences from reference values are stored, and information on a table of the number of bit data of 24 to serve as the reference values (Table 3(b)). As the number of bit data to serve as the reference values, there may be used a table reconstructed based on the conversion condition 705 in which the differences from the reference values are stored, or the information on the table of the number of bit data to serve as the reference values itself. The conversion condition selector 706 selects the conversion condition 705 corresponding to the pixel size input from the pixel size output unit 704. The conversion condition selector 706 reconstructs the table of Table 3(c) based on the selected conversion condition 705 (for example, when the number of bit data is 32, Table 3(a)) and the reference table (Table 3(b)), and outputs the reconstructed table to the PWM converter 701.

In Table 3(a), the first column indicates the gradation data of one pixel, and W in the second column indicates a difference from the reference value of the length of first white bits of white, black, and white bits of the PWM signal. Here, the reference values are the table in the case in which the number of bit data (pixel size) of one pixel is 24, and the table to serve as the reference values is shown in Table 3(b). Table 3(b) corresponds to Table 1(b). Another pixel size may be set for the reference values. Table 3(c) is a table storing the run lengths for W and B in the case in which the number of bit data of one pixel is 32, and corresponds to Table 1(a). In Table 3(c), columns in the table show a state in which the table of the run lengths for W and B in the case in which the number of bit data is 32 is reconstructed, based on Table 3(a) storing the differences from the reference values and Table 3(b) as the reference values. For example, W for the gradation data of one pixel of 0 is determined, based on two tables of Table 3(a) and Table 3(b), as 12+4=16. Similarly, B in Table 3(a) indicates a difference in length of black bits from the reference value, and B for the gradation data of one pixel of 5 is determined, based on the two tables of Table 3(a) and Table 3(b), as 9+3=12, for example. In the third embodiment, the conversion condition selector 706 adds difference values for W and B corresponding to each level of the gradation data in the table of Table 3(a) to the run lengths corresponding to each level of the gradation data in Table 3(b) to serve as the reference values, to thereby reconstruct run lengths for a predetermined pixel size. A run length of W' is determined based on Expression (5). The PWM converter 701 converts, based on the reconstructed table input from the conversion condition selector 706, the combination of the run lengths of white and black bits into the bit pattern, and outputs the bit pattern to the parallel/serial converter 702. A configuration in which the PWM converter 701 converts the bit pattern of the gradation data into the bit pattern of the PWM data is similar to those in the first and second embodiments, and a description thereof is omitted.

In the second embodiment, the number of bits representing the table values of W and B for the numbers of bit data of one pixel of 24 to 32 is 6 bits ($\geq \log_2(32+1)$). In contrast, the number of bits representing the table values of the differences of W and B from the reference values for the numbers of bit data of 25 to 32 in the third embodiment is only 4 bits ($\geq \log_2(8+1)$) for B of Table 3(a). Therefore, there can be obtained the effect that a capacity required to store the table of the conversion condition 705 in the third embodiment can be reduced by about 30% (from 6 bits to 4 bits) or more as compared to the table storing the run lengths themselves.

As described above, according to the third embodiment, a reduction in gradation characteristics of an output image can be suppressed.

Fourth Embodiment

A fourth embodiment of the present invention is similar to the first embodiment in basic configuration, and is different from the first embodiment in method of expressing the conversion condition 705. In the fourth embodiment, the conversion condition 705 is expressed only by a run length of black bits. The conversion conditions 705 of the fourth embodiment, which correspond to Table 1(a) and Table 1(b) of the first embodiment, are shown in Table 4(a) and Table 4(b).

TABLE 4

| Input | B | Input | B |
|---|---|---|---|
| 0 | 0 | 0 | 0 |
| 1 | 3 | 1 | 3 |
| 2 | 6 | 2 | 5 |
| 3 | 8 | 3 | 6 |
| 4 | 10 | 4 | 8 |
| 5 | 12 | 5 | 9 |
| 6 | 14 | 6 | 11 |
| 7 | 16 | 7 | 12 |
| 8 | 18 | 8 | 14 |
| 9 | 20 | 9 | 15 |
| 10 | 22 | 10 | 17 |
| 11 | 24 | 11 | 18 |
| 12 | 26 | 12 | 20 |
| 13 | 28 | 13 | 21 |
| 14 | 30 | 14 | 23 |
| 15 | 32 | 15 | 24 |
| (a) | | (b) | |

In Table 4(a), there is shown the conversion condition 705 (conversion condition 9) in a case in which the pixel size is 32. In Table 4(b), there is shown the conversion condition 705 (conversion condition 1) in a case in which the pixel size is 24.

In Table 4(a) and Table 4(b), the left column indicates the gradation data of one pixel. In Table 4(a) and Table 4(b), "B" in the right column indicates, when one pixel corresponding to the gradation data in the left column is divided by a predetermined number of bit data, a length (width) of the number of bit data expressed as black, and is the ON width of the PWM signal. When the PWM data is expressed by white, black, and white bits, the length of first white bits is represented by W, the length of black bits is represented by B, and the length of white bits after the black bits is represented by W'. When the pixel size (number of bit data) is represented by S, B is the length shown in Table 4(a) and Table 4(b), W is W=INT((S−B)/2), and W' is determined as: W'=S−B−W. Here, INT( ) is a function that returns an integer part of an argument. For example, when the pixel size S is 24 (S=24), and when the input gradation data is 6 (bit pattern of '0110'), the PWM converter 701 determines the length B of black bits to be 11 (B=11) based on Table 4(b). Then, the length W of white bits before the black bits is W=INT((24−11)/2)=INT(6.5)=6, and the length W' of white bits after the black bits is W'=(24−11−6)=7. In other words, the PWM converter 701 converts the bit pattern of '0110' into '00000011111111110000000' based on Table 4(b). W' and W may be determined as: W'=INT((S−B)/2) and W=S−B−W'.

In the fourth embodiment, there is obtained a PWM signal in which the black region grows from the center of the pixel (hereinafter referred to as "center-growing PWM signal"). However, there may be obtained a PWM signal in which the black region grows from the leading edge of the pixel (left-growing PWM signal), for example. In the left-growing PWM signals, when the ON width of the PWM signal is expressed as black, and the OFF width is expressed as white, and when the length of black bits is represented by B, the length of white bits is represented by W, and the pixel size is represented by S, the length W of white bits is determined by the following expression: W=S−B. The present invention is also applicable to a pattern in which the black region grows from the trailing edge of the pixel, or to a pattern in which the black region grows from both edges of the pixel to the center. Moreover, information on a set of not only the width of black region (ON width of the PWM signal) but also associated information, for example, a position in the pixel, may be treated as the conversion condition, and the present invention is also applicable to such a case.

In the above-mentioned embodiments, the maximum number of bit data of one pixel is 32, but the present invention may be embodied even with a higher number of bit data enabled by digital control by means of a delay-locked loop (DLL) and other such technologies.

In the above-mentioned embodiments, the conversion condition is associated with the pulse width of the PWM signal (or PWM pattern), but may be associated with another parameter indicating the gradation of the pixel. For example, such gradation of the pixel as in FIG. 4A may be associated with laser emission intensity. Moreover, the conversion condition 705 may be expressed by a combination of the laser emission intensity and the PWM signal.

As described above, according to the fourth embodiment, a reduction in gradation characteristics of an output image can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-215366, filed Nov. 2, 2016, which is hereby incorporated by reference herein in its entirety.

What is claimed is:

1. An image forming apparatus, comprising:
a photosensitive member configured to rotate in a first direction;
an exposure unit, which includes a light source configured to radiate a light beam and a driving unit configured to drive the light source, and which is configured to scan the photosensitive member with the light beam in a second direction substantially orthogonal to the first direction to form an electrostatic latent image;
a determination unit configured to determine, depending on a position in the second direction of a predetermined pixel of image data that has been input, a number of bit data per pixel for the predetermined pixel;
a selection unit, which has a plurality of conversion conditions for converting the image data into a bit pattern for driving the driving unit, and which is configured to select a predetermined conversion condition from among the plurality of conversion conditions depending on the number of bit data determined by the determination unit, the plurality of conversion conditions being set such that numbers of bit data included in the bit pattern obtained after the conversion for radiating the light beam are different, and such that the numbers of bit data are different depending on the image data; and
a generation unit configured to generate, based on the predetermined conversion condition selected by the selection unit, and on a density value of the predetermined pixel, the bit pattern for generating a PWM signal for driving the driving unit for the predetermined pixel.

2. An image forming apparatus according to claim 1, wherein each of the plurality of conversion conditions comprises information in which gradation data indicating the density value is associated with the bit pattern for generating the PWM signal.

3. An image forming apparatus according to claim 1, wherein each of the plurality of conversion conditions comprises information in which gradation data indicating the density value is associated with a length of consecutive bits of a predetermined density.

4. An image forming apparatus according to claim 1, wherein each of the plurality of conversion conditions comprises information in which gradation data indicating the density value is associated with a difference between a reference length of consecutive bits of a predetermined density and a length of consecutive bits of a predetermined density.

5. An image forming apparatus according to claim 4, wherein the selection unit is configured to reconstruct, based on the reference length of consecutive bits of the predetermined density and the difference, a length of consecutive bits of the predetermined density corresponding to gradation data of the predetermined pixel.

6. An image forming apparatus according to claim 1, wherein the exposure unit comprises a deflection unit configured to deflect the light beam radiated from the light source to directly scan the photosensitive member with the light beam deflected by the deflection unit.

7. An image forming apparatus according to claim 1, wherein the exposure unit comprises:
a deflection unit configured to deflect the light beam radiated from the light source; and
an fθ lens configured to optically correct the light beam deflected by the deflection unit, and to guide the light beam to the photosensitive member.

* * * * *